United States Patent [19]

Umetsu et al.

[11] Patent Number: 5,269,978
[45] Date of Patent: Dec. 14, 1993

[54] METHOD OF MANUFACTURING OPTICAL ELEMENT

[75] Inventors: Sachio Umetsu, Kawasaki; Takashi Arai, Tokyo; Yukihisa Baba, Yokohama, all of Japan

[73] Assignee: Canon Kabushiki Kaisha, Tokyo, Japan

[21] Appl. No.: 844,776

[22] Filed: Mar. 2, 1992

[30] Foreign Application Priority Data

Mar. 6, 1991 [JP] Japan .................. 3-063780

[51] Int. Cl.⁵ ........................................ B29C 35/08
[52] U.S. Cl. ........................ 264/1.4; 264/1.7; 264/1.9; 264/2.7; 425/174.4
[58] Field of Search .............. 264/1.4, 2.7, 1.7, 1.9; 425/174.4

[56] References Cited

U.S. PATENT DOCUMENTS

| | | | |
|---|---|---|---|
| 4,566,930 | 1/1986 | Uehara | 264/1.7 |
| 4,890,997 | 1/1990 | Beins et al. | 425/174.4 |
| 4,968,383 | 11/1990 | Volkmann et al. | 156/272.8 |
| 5,028,330 | 7/1991 | Caronia et al. | 210/493.2 |
| 5,124,089 | 6/1992 | Ohkoshi et al. | 264/1.7 |
| 5,135,685 | 8/1992 | Masuhara et al. | 264/1.4 |
| 5,135,686 | 8/1992 | Masuhara et al. | 264/1.4 |
| 5,164,228 | 11/1992 | Peralta et al. | 427/164 |
| 5,188,650 | 2/1993 | Nomura | 425/808 |

FOREIGN PATENT DOCUMENTS

| | | |
|---|---|---|
| 0366545 | 5/1990 | European Pat. Off. |
| 48-26150 | 4/1973 | Japan |
| 52-25651 | 2/1977 | Japan |
| 57-87332 | 5/1982 | Japan ............... 425/174.4 |
| 62-227711 | 10/1987 | Japan |
| 62-288030 | 12/1987 | Japan |
| 63-95912 | 4/1988 | Japan ............... 425/808 |
| 1263034 | 10/1989 | Japan |
| WO9015654 | 12/1990 | PCT Int'l Appl. |

*Primary Examiner*—Jeffery Thurlow
*Attorney, Agent, or Firm*—Fitzpatrick, Cella, Harper & Scinto

[57] ABSTRACT

A plurality of mold members are disposed on an index table to be intermittently rotatably driven. Energy sources for curing the activation energy curable resin at positions to which the mold members are intermittently moved, a first robot for supplying a molding parent material to the mold member, a second robot for taking out an optical element after molding from the mold member, and a third robot for supplying the activation energy curable resin before supplying the molding parent material to the mold member are disposed proximate to the index table. The operations of each robot are performed together at each moved position of the mold member.

3 Claims, 6 Drawing Sheets

FIG. 4
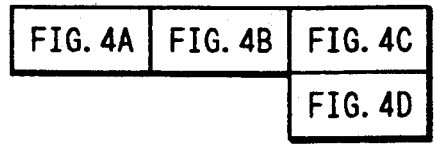
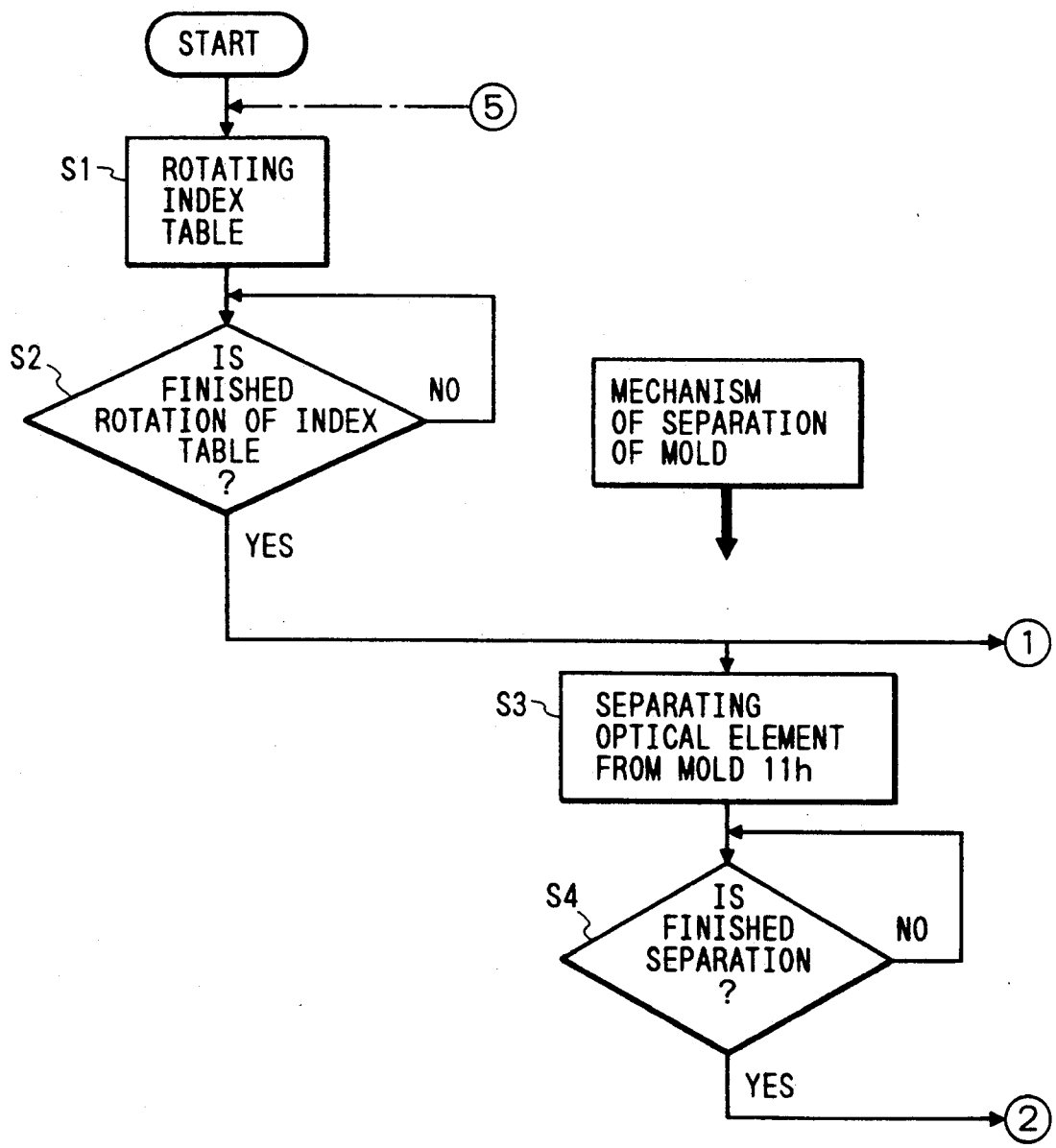
FIG. 4A

METHOD OF MANUFACTURING OPTICAL ELEMENT

BACKGROUND OF THE INVENTION

1. Field of the Invention

The present invention relates to a molding method and its molding apparatus for molding an optical element by dripping and adhering an activation energy curable resin to a glass member made of a glass material, and forming a resin film on a surface of the glass member.

2. Related Background Art

Recently, a manufacturing method for an optical element with the replica molding to shape a functional surface of optical element with a mold member having a predetermined surface accuracy has been developed. For example, reference is made to Japanese Patent Application Laid-open No. 48-26150 and No. 52-25651. When the optical element is manufactured with the replica molding, a layer of activation energy curable resin is provided in part or entirely on the surface of the glass optical element to serve as an optical functional surface. Therefore, in molding, firstly, when the molding parent member is supplied, the liquid activation energy curable resin is supplied to the mold member, which is then clamped. Then, the resin is cured with the irradiation of the energy to form a resin film on a surface of the molding parent member.

However, the above-described manufacturing apparatus for the optical element is constituted of one mold member, and one energy source corresponding thereto, as described in Japanese Patent Application Laid-open No. 62-227711 or No. 62-288030, for example, and has the following drawbacks with respect to productivity.

(1) Since the operations such as opening or closing of the mold member, supply of resin, supply of molding parent member, irradiation of energy, and picking up of optical element after molding, are performed in series, it takes a longer time, resulting in a less productivity.

(2) In general, when the activation energy curable resin is cured, the internal stress and strain due to the hardening of resin may increase unless it is cured a long time using an energy source of weak output, resulting in a problem that a desired molding accuracy can not be obtained. Therefore, the curing time occupies a large part of the manufacturing time, impeding the improvement of productivity.

SUMMARY OF THE INVENTION

The present invention has been achieved in light of the foregoing shortcomings, and aims to provide a method of manufacturing an optical element, with a shortened waste time, improved productivity, and a better yield, by simultaneously performing operations of working means such as robot corresponding to each work operation, while taking into consideration the time allocation for each working process in the manufacturing of optical element.

The present invention provides a method of manufacturing an optical element in an apparatus in which a film of resin is formed on a surface of a molding parent member by supplying an activation energy curable resin in supplying the molding parent member to a mold member, which is then clamped, and irradiating the activation energy thereto to cure the resin. A plurality of mold members are disposed on an index table to be intermittently and rotatably driven to each specific position, or station, on the index table. At each particular station are disposed an energy source for curing an activation energy curable resin, a first robot for supplying said base material to said mold member, a second robot for taking out the optical element after molding from said mold member, and a third robot for supplying said activation energy curable resin before supplying said base material to said mold member. In addition, a control operation of said each robot is managed so as to be performed in unison by means of a control mechanism at each said mold member.

DESCRIPTION OF THE PREFERRED EMBODIMENT

Figure 1:
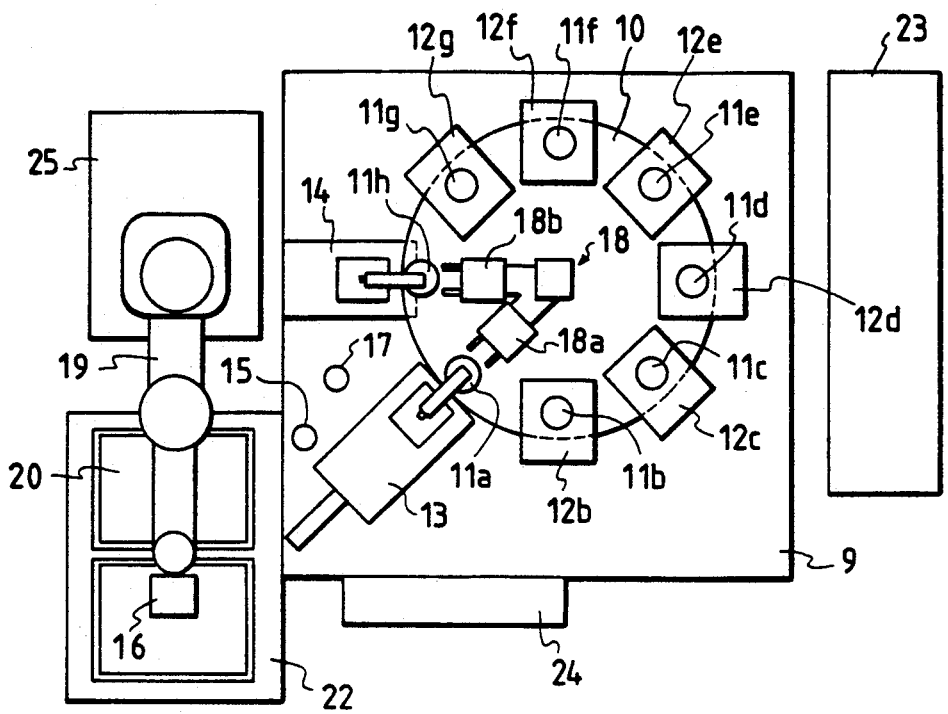
FIG. 1 is a schematic constitutional plan view for explaining one embodiment of the present invention.
Figure 2:
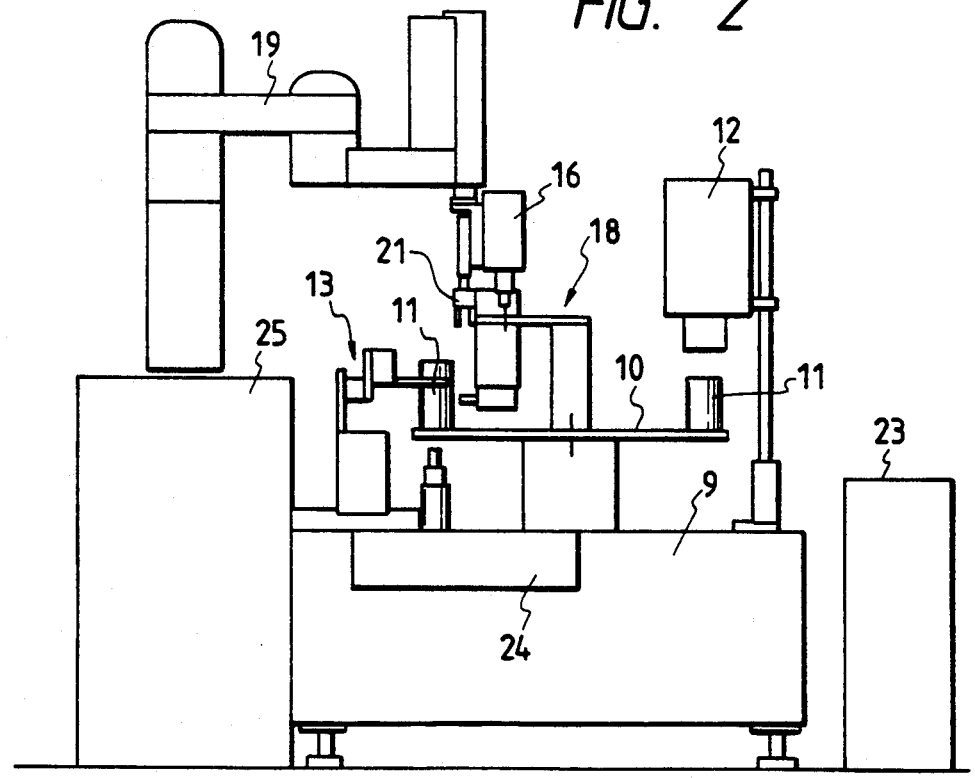
FIG. 2 is a schematic constitutional side view for explaining the embodiment of the present invention.

An embodiment of a manufacturing apparatus of the present invention will be specifically described with reference to the drawings. In FIGS. 1 and 2, numeral 9 is a frame for supporting an disk-type index table 10 driven intermittently, on which a plurality of mold members 11 (11a to 11h) are disposed at equally spaced intervals (eight equal parts in this example) along a circular locus around a rotational center thereof. Also, on the frame 9 and a robot frame 25 juxtaposed thereto, there are disposed ultraviolet irradiation apparatuses 12 (12b to 12g) as the energy sources for curing the activation energy curable resin, e.g., ultraviolet curable resin, at positions corresponding to the intermittent movement of the mold members 11 on the index table 10, a first robot 13 for supplying a molding parent member to the mold member 11, a second robot 14 for picking up an optical element after molding from the mold member 11, and a third robot 19 for supplying the activation energy curable resin before supplying the molding parent member to the mold member 11.

Also, on the frame 9 are installed a temporary table 15 for temporarily placing the molding parent member prior to processing, and a Petri dish 17 for the curable resin. Further, the robot 19 is equipped with a liquid supplying apparatus 16 for supplying a determined amount of liquid resin from the Petri dish 17 to the mold member 11 at a predetermined position, and a grasping band 21 for grasping the molding parent member. In the above example, a mold opening/closing mechanism 18 for opening or closing the mold member 11 is disposed with its operation portions 18a and 18b opposed respectively to the robots 13 and 14.

Juxtaposed with the frame 9, a pallet supplying apparatus 22 is located in an operation range of the robot 13, and is provided with pallets 20 having a predetermined number of molding parent members loaded thereon.

Further, at each position of the mold member 11, the control operation for each robot is managed to be performed in unison. For example, a control mechanism 23 such as a computer is installed, with a control panel 24 having a command supervisory system prepared for the control operation.

Figure 3:
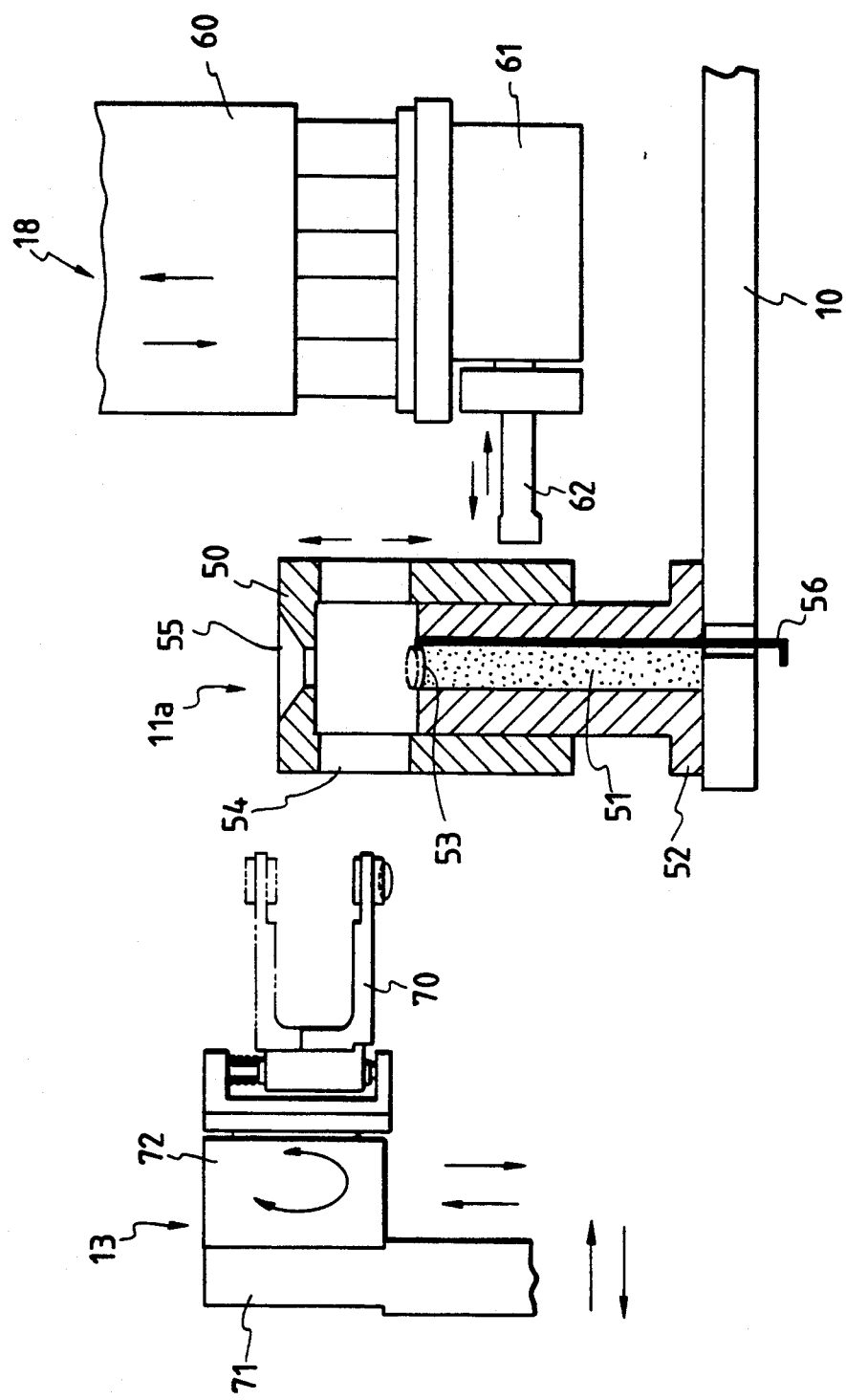
FIG. 3 is a schematic partial constitutional side view for explaining the embodiment.

More particularly, the mold member 11 is one in which a mold 51 having a molding surface corresponding to a functional face of the optical element on an upper face thereof is held on the index table 10 by the use of a holding member 52, and a cover member 50 is vertically slidably fitted over the holding member 52, in which a window aperture 55 for irradiating the energy is formed on a top portion of the cover member 50, and a lateral window aperture 54 for the supply of the molding parent member is bored on its lateral portion, as shown in FIG. 3. And an ejector rod 56 acting as a mold separating mechanism is equipped on the molding surface. The mold opening/closing mechanism 18 has a head 61 vertically movable relative to a housing 60, and an opening or closing claw 62 for lifting vertically the cover member 50 attached to the head 61. Further, the robots 13 and 14 have a head 71, which is vertically movable, comprising a revolving mechanism 72 revolvable around a horizontal axis, which in turn comprises suction band 70 vertically reversible with its revolution.

Figure 4B:
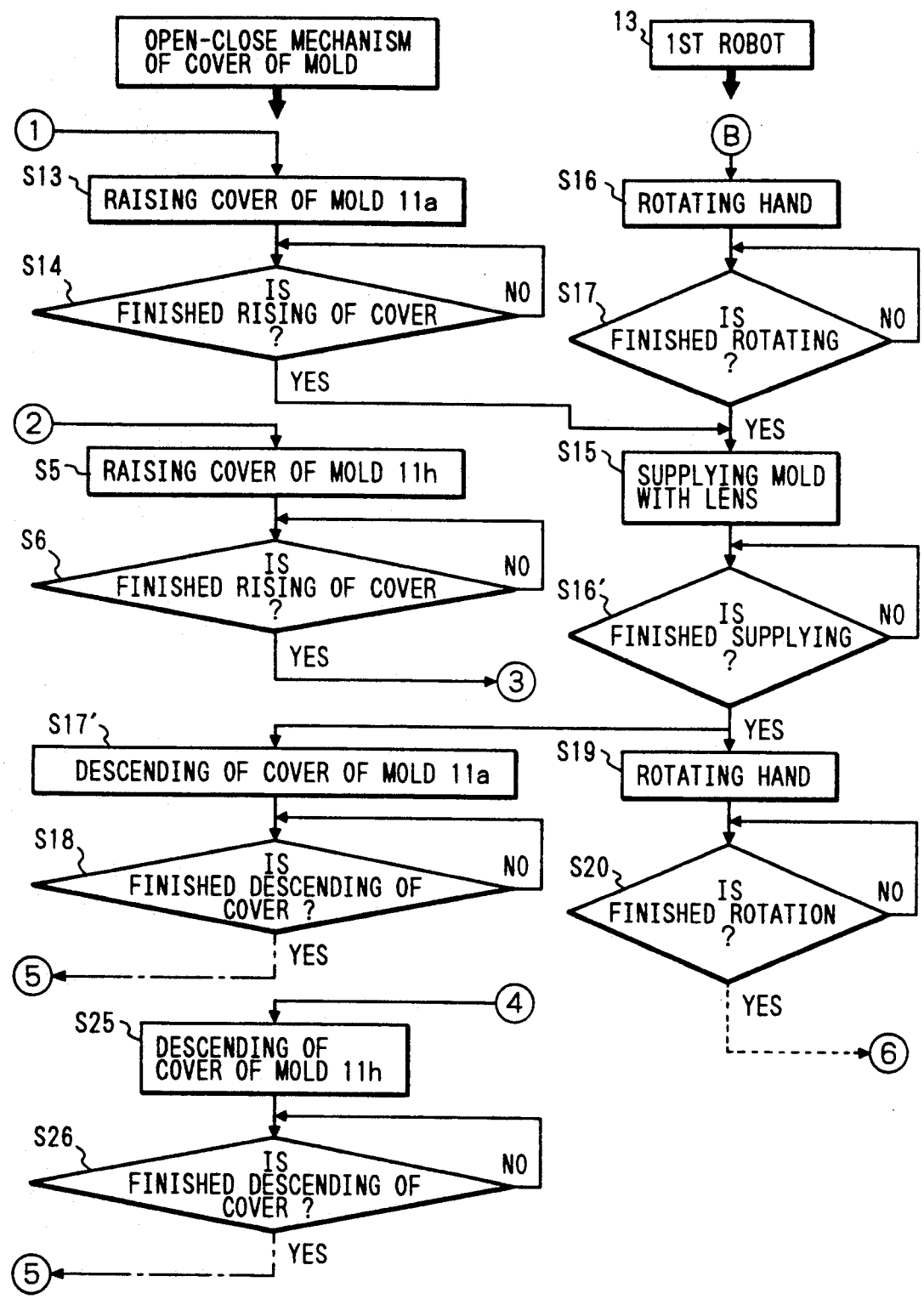
FIG. 4 is a flowchart showing an operation procedure of, which is comprised of FIGS. 4A, 4B, 4C and 4D, control mechanism in the embodiment.
Figure 4C:
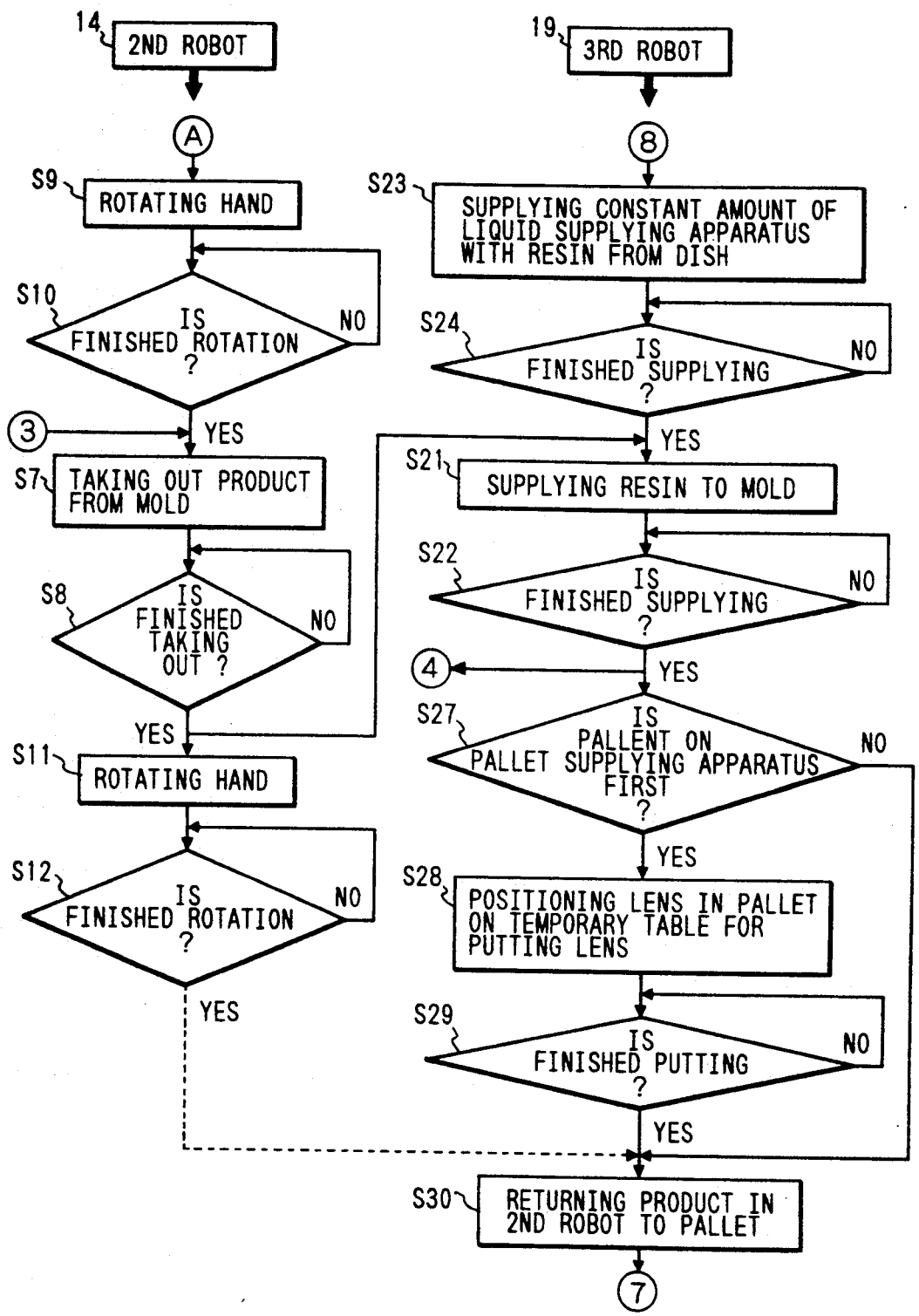
Figure 4D:
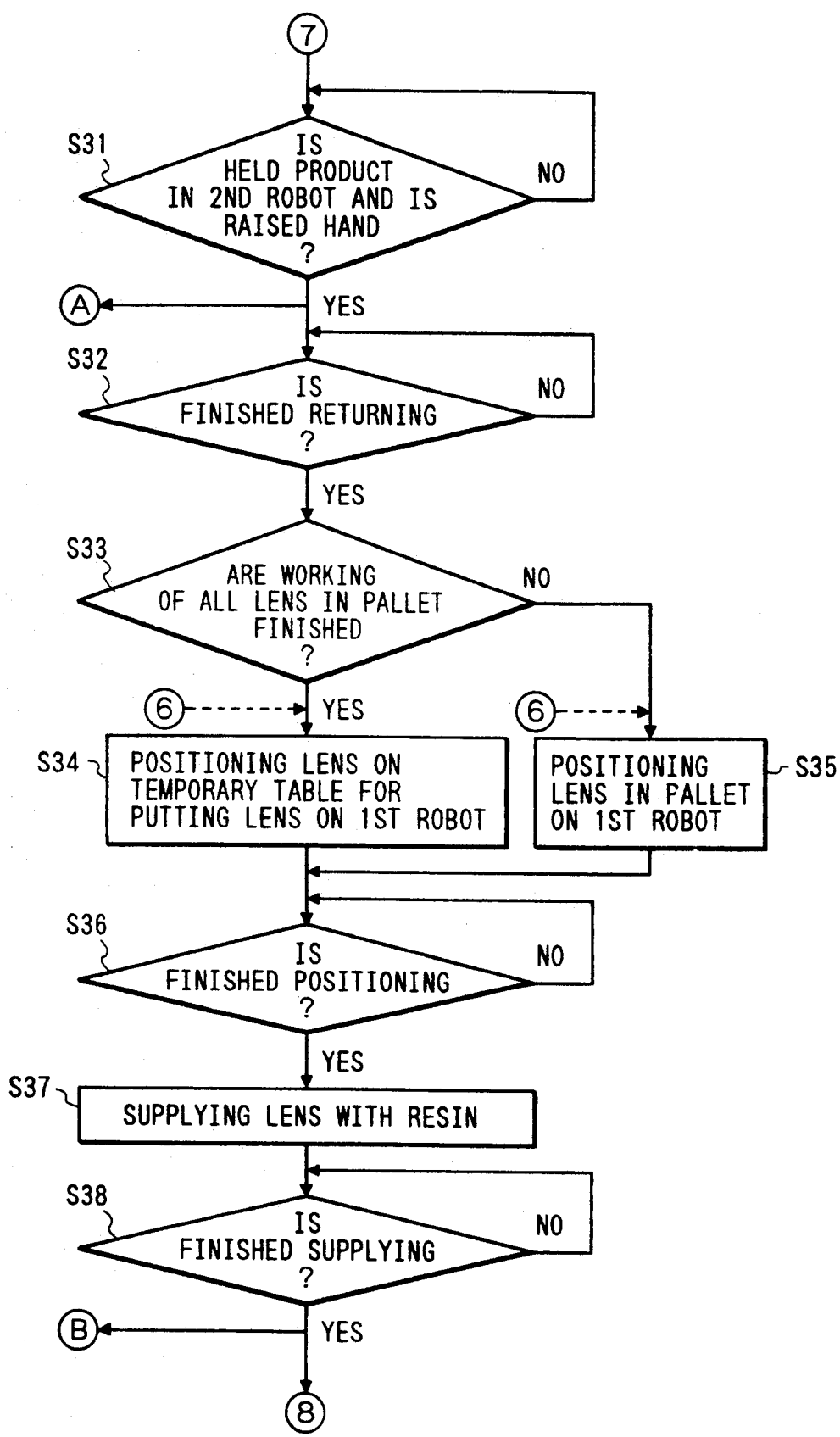

Next, the operation procedure of the control mechanism according to the present invention will be described specifically with reference to a flowchart as shown in FIG. 4. As will be appreciated, FIG. 4 consists of the flowcharts illustrated in FIGS. 4A–4D.

To start this apparatus, a first rotational movement for the index table is performed (S1). And a check is made to determine whether or not a predetermined amount of rotation is finished (S2). Thus, in the mold member as indicated at 11h in FIG. 1, a finished molding parent member or optical element is separated from the molding surface with the mold separating operation by the action of the ejector rod 56 (S3), and then a check is made to determine whether or not this separating operation is completed (S4). Next, the mold opening/closing mechanism 18 starts the operation of opening the mold member by means of the opening/closing claw 62 of the operation portion 18b (S5), and if that operation is completed (S6), the suction band 70 of the second robot 14 is introduced into the mold member and the optical element is taken out (S7 and S8). In this case, prior to the step (S7), the second robot 14 has its suction band 70 reversed in a posture for taking out the optical element (S9 and S10). And after the step (S8), the second robot 14 reverses the suction band 70 again (S11 and S12), delivering a finished product to conveying means (not shown).

At the same time, the mold opening/closing mechanism 18 starts the operation of opening the mold member as indicated by 11a in FIG. 1 by means of the opening or closing claw 62 of the operation portion 18a (S13), and if that operation is completed (S14), the suction band 70 of the first robot 13 is introduced into the mold member and the molding parent member is placed on the molding surface (S15 and S16'). To this end, the first robot 13 has the suction band 70 reversed in advance prior to the step (S15), so that the molding parent member sucked by the suction band 70 may be directed downward. When the molding parent member has been supplied to the mold member and the first robot 13 retracts the suction band 70 from the mold member (S16), the mold opening/closing mechanism 18 drives the opening or closing claw 62 of its operation portion 18a to close the mold member to clamp the mold (S17', 18), while the first robot 13 reverses the suction band 70 again (S19, 20).

After the step (S8) is finished, a liquid activation energy curable resin is supplied to the mold member as indicated by 11h in FIG. 1 by the third robot 19 (S21 and S22). To this end, prior to the step (S21), a liquid supplying apparatus 16 provided on the robot 19 should be brought to the Petri dish 17 for the supply of resin (S23 and S24). After the resin is supplied (S22), the mold opening/closing mechanism 18 activates the opening or closing claw 62 of its operation portion 18b to close the mold member (S25 and S26).

At this stage, a check is made to determine whether or not the supply operation of pallet 20 has been made with the pallet supplying apparatus (S27), and if it is immediately after the supply operation, one of a plurality of molding parent members on the pallet 20 is placed on the temporary table 15 to make a space on the pallet 20 by using the third robot 19 (S28 and S29). If the step (S27) is already once passed (for example, in the control mechanism 23, the counter is set to zero by the operation of the pallet supplying apparatus 22, and then is counted up by one every time the step (S27) is passed, thereby judging its value), the finished optical element is returned to the space of the pallet 20 from the second robot 14 (S30, S31, S32), after the step (S12). At the step (S30), the grasping band 21 of the third robot 19 grasps the optical element from the second robot 14, and after the grasping band 21 is raised up to a predetermined position (S31), the suction band 70 is revolved (S9, S10) to be placed in the posture for taking out the optical element. Also, the control mechanism 23 reads the counter at this stage, and a check is made to determine whether or not the counter reaches the number (a predetermined value) of molding parent members loaded on the pallet 20 (S33). If it reaches the predetermined value, the molding parent member placed previously on the temporary table 15 is put on the robot 13 (S34), while if it is below the predetermined value, the next molding parent member is picked up from the pallet 20 (S35).

If this pick-up has been confirmed (S36), the robot 19 supplies the liquid resin to the molding parent member on the suction band 70 of the first robot 13 as indicated by 70 with the two-dot chain line in FIG. 3 by means of the liquid supplying apparatus 16 (S37). And after the termination of this supply (S38), the routine returns to the step (S23). The robot 13 returns to the step (S16). On the other hand, the robot 14 returns to the step (S9) at the stage when the step (S31) is terminated. After the mold opening/closing mechanism 18 terminates the steps (S18 and S26), the control mechanism 23 directs the index table 10 to be rotated. Thus, the routine returns to the step (S1).

In the process of intermittent rotational operation of the index table 10, the activation energy e.g., ultraviolet from each irradiation apparatus 12b to 12g is irradiated via 55 to the resin on each mold member at each position as indicated by 11b to 11g in FIG. 1, which is then cured. The energy output of each irradiation apparatus in this case has independent output value such that it is weak on former half portions 12b to 12d and strong on latter half portions 12e to 12g.

While in the above example, the resin film is formed on one side of molding parent member, it will be appreciated that it can be formed on both sides. While a spherical glass lens is adopted as the molding parent member, as shown in FIG. 2, it will be appreciated that the present invention is also applicable to the molding parent member having a number of grooves on the glass plate such as a diffraction grating. Also, the ultraviolet ray curable resin is adopted as the activation energy curable resin, but in addition, the resin curable with other active energy such as heat ray, visible ray, infrared ray or X ray may be also used.

As detailed above, the present invention allows for the simultaneous operation of working means such as a robot for performing each individual function, thus reducing down time, improving productivity and increasing manufacturing yield. The present invention provides energy line sources for curing the active energy line curable resin, a first robot for supplying a molding parent material to the mold member, a second robot for picking up an optical element after molding from the mold member, and a third robot for supplying the activation curable resin before supplying the molding parent material to the mold member are disposed, whereby the control operation of each robot is managed to operate simultaneously at each position of the moving mold member. Also, the resin curing process can be performed by dividing it into a plurality of processes, so that it is possible to make the timely control of curing, and manufacture high quality products without stress and stain while still providing a better yield.

What is claimed is:

1. A method of molding a composite optical element comprised of an optical base material and a resin material, said method comprising the steps of:

disposing a plurality of mold members at spaced intervals on a rotatable table;

supplying continuously a resin material to each mold member on the table from resin supplying means provided at a fixed position relative to the rotatable table;

rotating the table to move each mold member supplied with the resin material to a position to receive an optical base material onto the resin material by supplying means for supplying the optical base material;

irradiating the resin material with an energy ray through each optical base material during rotation of the table for adhering the resin material onto the optical base material;

removing a molded product from the mold member rotated to a fixed removing position on the rotating table, with the molded product being removed by product removing means provided at the removing position; and supplying a new resin material into the mold member from which the molded product has been removed at the removing position.

2. A method according to claim 1, wherein each mold member includes a pressing member applying a pressing down force on the optical base material supplied onto the resin material, with the pressing member releasing the pressing down force when the mold member is rotated to the removing position, and the steps of removing the molded produce and supplying a new resin material are performed during the releasing step.

3. A method according to claim 2, wherein the irradiation of the energy ray is performed through the pressing member and the optical base material during the step of pressing down the optical base material by the pressing member.

* * * * *

UNITED STATES PATENT AND TRADEMARK OFFICE
CERTIFICATE OF CORRECTION

PATENT NO. : 5,269,978
DATED : December 14, 1993
INVENTOR(S) : Umetsu et al.

It is certified that error appears in the above-indentified patent and that said Letters Patent is hereby corrected as shown below:

TITLE PAGE

[56] REFERENCES CITED:

FOREIGN PATENT DOCUMENTS, "1263034  10/1989  Japan" should read --1-263034  10/1989  Japan--.

[57] ABSTRACT:

Line 11, "operations" should read --control operations--.

COLUMN 2:

Line 20, "FIG. 4" should read --FIG. 4, which is comprised of FIGS. 4A, 4B, 4C and 4D,--.
Line 21, "of, which is comprised of FIGS. 4A, 4B, 4C and" should read --of--.
Line 22, "4D," should read --a--.

UNITED STATES PATENT AND TRADEMARK OFFICE
CERTIFICATE OF CORRECTION

PATENT NO. : 5,269,978
DATED : December 14, 1993
INVENTOR(S) : Umetsu et al.

It is certified that error appears in the above-indentified patent and that said Letters Patent is hereby corrected as shown below:

COLUMN 6:

Line 26, "produce" should read --product--

Signed and Sealed this

Thirteenth Day of September, 1994

Attest:

BRUCE LEHMAN

Attesting Officer   Commissioner of Patents and Trademarks